United States Patent [19]

Goldman

[11] Patent Number: 4,799,328
[45] Date of Patent: Jan. 24, 1989

[54] FISHING BOBBER WITH SCENT EMISSION

[76] Inventor: Jeffrey R. Goldman, 195 Lark St., Albany, N.Y. 12210

[21] Appl. No.: 95,769

[22] Filed: Sep. 14, 1987

[51] Int. Cl.⁴ .............................................. A01K 93/00
[52] U.S. Cl. .................................. 43/42.06; 43/44.87; 43/44.99
[58] Field of Search ................. 43/42.06, 44.87, 44.91, 43/44.92, 44.95, 44.99

[56] References Cited

U.S. PATENT DOCUMENTS

| | | | |
|---|---|---|---|
| 2,091,457 | 8/1937 | Sauer | 43/42.06 |
| 2,670,560 | 3/1954 | Matras | 43/44.87 |
| 2,817,179 | 12/1957 | Kelley | 43/44.99 |
| 3,974,591 | 8/1976 | Ray | 43/44.99 |

FOREIGN PATENT DOCUMENTS 1464512  11/1966  France ............................. 43/44.99

*Primary Examiner*—Gene P. Crosby
*Attorney, Agent, or Firm*—Schmeiser, Morelle & Watts

[57] ABSTRACT

A scent emitting fishing bobber having flow regulation ports and an absorptive compressive material for holding the scent substance. A retention-pressure plate moves between an advanced position wherein the absorptive material is compressed and a retracted position which closes the scent substance inlet.

5 Claims, 1 Drawing Sheet

FISHING BOBBER WITH SCENT EMISSION

FIELD OF THE INVENTION

The present invention relates to fishing bobbers and in particular to a bobber having means of emitting fish-attracting substances therefrom.

BACKGROUND OF THE INVENTION

Fishermen have found it advantageous to use, in addition to live and artificial bait, substances such as oils and extracts which provide a scent in the water to attract fish to the area.

The methods of dispersing the attractant in the water are varied. One method has been to pour or spread the fish attractant on the water surface. Another method is to apply the attractant directly on the exterior of the bait. Still another method is to use individual lures which are specifically manufactured to hold and disperse fish attractants.

Although widely practiced, it has been found that the methods presently used for dispersement of fish attractant are disadvantageous for several reasons. Primarily, the devices are not adaptable, and thus fail to provide controlled delivery of the attractant under varying water conditions. For example, in a fast running stream, attractant put directly into the water or applied to the bait would quickly dissipate requiring constant reapplication for the attractant to be effective. This is not only time-consuming but also expensive since large amounts of attractant would be used. Similarly, a lure containing an attractant filled receptacle with large ports for receiving and discharging water would be ineffective because the attractant would be quickly extracted from the receptacle. However, in a calm lake the same lure may slowly and satisfactorily release the attractant. Thus, the lure is effective in some water conditions but useless in others.

Another disadvantage of the present art of fish-attractant dispersing devices is the limited use of the lures. Although, the lures are typically capable of being utilized with or without fish attractant they are not versatile, i.e. a variety of attractant containing lures are necessary to meet specific fishing situations. Thus, these devices have narrow and limited functions.

Another important disadvantage of the fish attractant lures now available is their lack of storage capabilities. Once filled with a fish-attracting substance, the attractant will uncontrollably seep out of the receiving and discharging ports regardless of whether the lure is in or out of the water.

Still another disadvantage is that the present lures are specifically designed to slowly disperse the attractant and thus are incapable of the quick release needed to effectively prime an area.

In an attempt to overcome some of these difficulties fish attractant lures which may function as bobbers have been developed. However, these bobbers have not found wide acceptance, primarily because the liquid attractant undesirably effects the dynamics of the functioning bobber. One of the main functions of a bobber is to visually inform the fisherman when a fish is "hitting" the bait. With the liquid-filled receptacle a wave, even of very small amplitude, will effect the motion of the liquid located within the lure receptacle causing the erratic movement of the bobber which misleads the fisherman.

SUMMARY OF THE INVENTION

The present invention is specifically adapted to overcome the problems associated with the prior art as outlined above.

The invention is structured to enable adaptability to different water conditions. The bobber consists of a lower and upper part, the lower part being a fish attractant receptacle that contains water receiving and discharging ports through which the attractant is released. The amount of attractant flowing through the ports is affected by two means. First, the receptacle contains a sponge-like material which receives the attractant. The water flowing through the ports slowly extracts the attractant from the sponge-like material, lengthening the time interval between attractant applications, and as a consequence, the amount of attractant used. Second, the size of the water receiving and discharging ports are variable thereby controlling the amount of water introduced into the bobber, and the amount of attractant being released.

Thus, the fisherman, may control the amount of attractant being released and get the same controlled and desired dispersement whether he is in a fast moving stream or on a calm lake.

The subject invention also functions as a bobber. The upper part of the device contains a material, such as styrofoam with a density less than water enabling it to float. Thus, the present invention is capable of use with a large variety of lures. The fisherman need only obtain one device which serves the purpose of both a bobber and a fish attractant dispenser.

The present invention employs valve means by which the water receiving and discharging ports may be sealed in addition to embodying legs which enable the bobber to remain in an upright, stationary position preventing seepage of the attractant. Thus, the attractant may remain sealed in the bobber for storage or while being handled by the fisherman.

The bobbing device also has the capacity to quickly dispense fish attractant into the water. A retention-pressure plate may be manually compressed against the sponge-like material containing the fish attractant, forcibly exuding the concentrated liquid through the water receiving and discharging ports.

Lastly, the sponge-like material contained in the lower part of the bobbing device will serve two functions. First, it will receive the liquid fish attractant and secondly, it will critically dampen the liquid in the receptacle and thus prevent erratic movement of the bobber which would mislead the fisherman.

It should be understood that the foregoing general description and the following detailed description as well are exemplary and explanatory of the invention but are not restrictive thereof. Thus, while the accompanying drawing referred to herein and constituting a part hereof illustrate preferred embodiments of the invention, and together with the description, serve to explain the principles of the invention, the scope of said invention should only be limited by the appended claims.

The accompanying drawings, referred to herein and constituting a part hereof, illustrate the preferred embodiments of the invention and together with the description, serve to explain the principles of the invention.

DESCRIPTION OF THE PREFERRED EMBODIMENT

Figure 1:
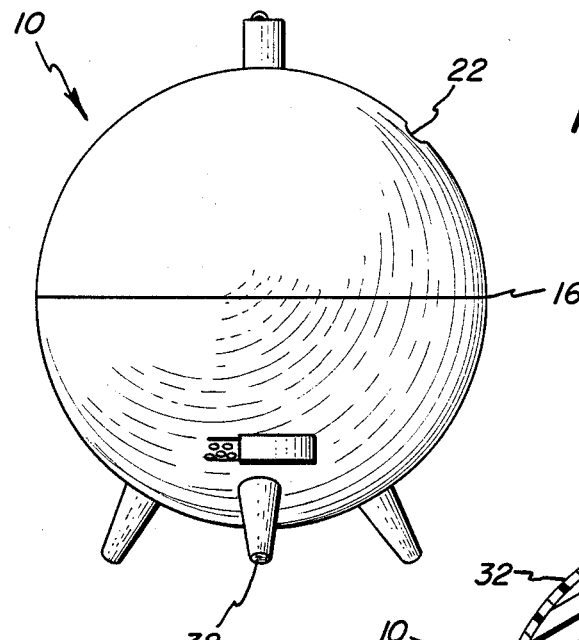
FIG. 1 is an elevational view of the preferred embodiment
Figure 2:
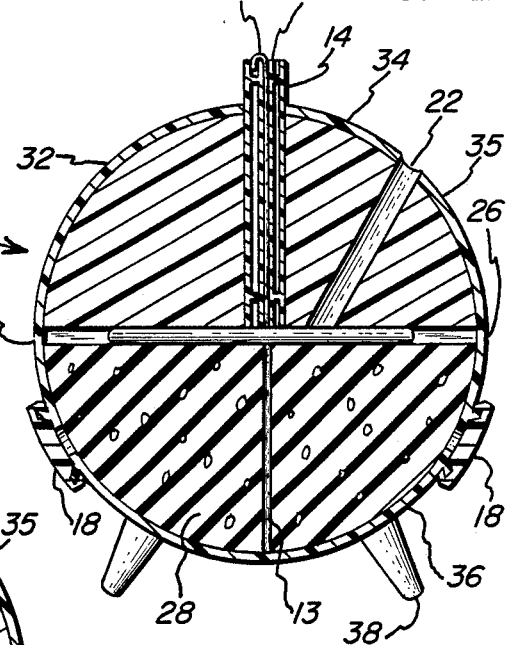
FIG. 2 is a longitudinal sectional view of the bobbing device shown in FIG. 1.
Figure 3:
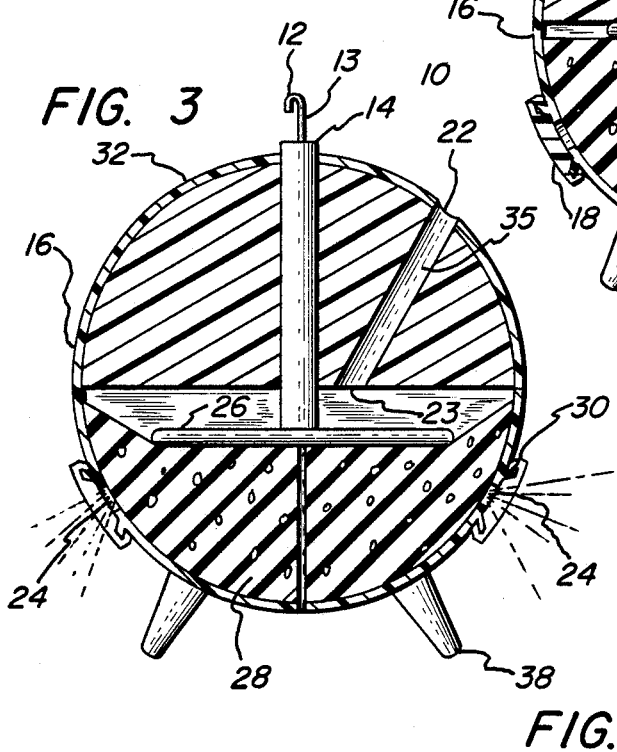
FIG. 3 is a longitudinal sectional of FIG. 1 showing the compression of the sponge.
Figure 4:
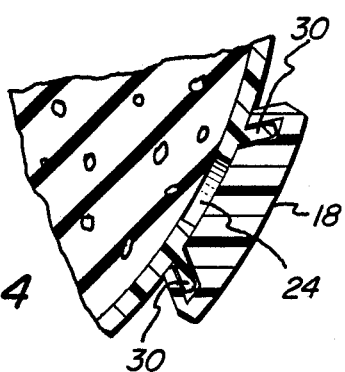
FIG. 4 is a fragmentary sectional view of the sliding means shown in FIG. 1.

Referring now more particularly to FIGS. 1-4 of the accompanying drawings, the bobber 10 is capable of being mounted on a fishline by means of placing the line beneath a hook 12 at the end of wire 13 which passes through the center of the bobber; the hook 12 secures the line against ridge 15 of tube 14. As is common with fishing bobbers the opposite end of wire 12 has another hook (not shown) which secures the line against the base of the bobber. In the subject invention, and on bobbers presently available a housing at the top of the bobber (not shown) contains a spring which biases a ridged tube upward against hook 12. In the subject invention the tube 14 extends through the apex of the upper part of the shell 16 to the center of the shell. Attached at the interior end of the tube 14 is a pressure-retention plate 26. This pressure-retention plate 26 lies coplanar, adjacent, and is supported on the upward side by a material 32 such as styrofoam having a density less than water. The pressure-retention plate 26 lies coplanar, adjacent and biased on the downward side by a sponge material 28. The tube 14 is capable of moving between an advanced position (as shown in FIG. 3) and retracted position (as shown in FIG. 2). In the advanced position, the pressure plate 26 compresses the sponge material 28 thereby exuding liquid from the sponge-like material 28.

The upper part 34 of the shell 16 contains an input port 22 which allows the introduction of the fish-attracting substance into the bobber 10. The substance reaches the sponge-like material by means of a hollow cylinder 35 extending from port 22 through material 32.

When the plate 26 is in its retracted position it seals the interior orifice 23 of cylinder 35.

The lower part 36 of the shell 16 contains two water receiving and discharging ports 24 which allow water flow through the sponge-like material 28. A sliding cover 18, moveable between an opened and closed position along guide means 30 adjusts the flow through ports 24.

Extending downward from the lower part 36 of the shell 16 are three legs 38. Legs 38 allow the bobbing device 10 to rest in a stable, and upright position thereby preventing the seepage of the fish-attracting substance into styrofoam 32.

What is claimed:

1. A fishing bobber with scent emission comprising:
    a shell having upper and lower parts, the lower part containing at least one or more water receiving and discharging ports;
    absorptive material within the shell;
    a retention-pressure plate moveable between an advanced and retracted position, movement of said pressure plate to said advanced position depressing said absorptive material;
    means for directing a fish-attracting substance into the absorptive material.

2. The invention of claim 1 wherein said pressure plate is biased to the retracted position against the directing means closing the communication between the directing means and the absorptive material.

3. The invention of claim 2 wherein said absorptive material is deformable and biases the pressure plate against the directing means.

4. The fishing bobber device of claim 1, further comprising valve means moveably secured over the water receiving and discharging ports whereby said port openings are adjustable in size and the amount of fish-attracting substance flowing into the water may be regulated.

5. The fishing bobbing device of claim 3, further comprising support means secured to the lower part of the shell Whereby the fishing bobber device may rest in a stationary upright position when placed on a planar surface thereby preventing the seepage of the fish-attracting substance.

* * * * *